United States Patent
Buoy et al.

(10) Patent No.: US 9,550,560 B2
(45) Date of Patent: Jan. 24, 2017

(54) JOYSTICK FOR CONTROLLING AN AIRCRAFT

(71) Applicant: SAGEM DEFENSE SECURITE, Boulogne-Billancourt (FR)

(72) Inventors: Florence Buoy, Boulogne-Billancourt (FR); Etienne Merlet, Boulogne-Billancourt (FR); Herve Gorecki, Boulogne-Billancourt (FR)

(73) Assignee: SAGEM DEFENSE SECURITE, Boulogne-Billancourt (FR)

( * ) Notice: Subject to any disclaimer, the term of this patent is extended or adjusted under 35 U.S.C. 154(b) by 45 days.

(21) Appl. No.: 14/405,766

(22) PCT Filed: Jun. 7, 2013

(86) PCT No.: PCT/EP2013/061794
§ 371 (c)(1),
(2) Date: Dec. 4, 2014

(87) PCT Pub. No.: WO2013/182680
PCT Pub. Date: Dec. 12, 2013

(65) Prior Publication Data
US 2015/0128754 A1 May 14, 2015

(30) Foreign Application Priority Data
Jun. 7, 2012 (FR) .................... 12 55325

(51) Int. Cl.
*G05G 1/08* (2006.01)
*B64C 13/04* (2006.01)
(Continued)

(52) U.S. Cl.
CPC ............... *B64C 13/04* (2013.01); *G05G 1/04* (2013.01); *G05G 5/03* (2013.01); *G05G 9/047* (2013.01);
(Continued)

(58) Field of Classification Search
CPC ............ G05G 5/03; G05G 1/04; G05G 9/047; B64C 13/04
See application file for complete search history.

(56) References Cited

U.S. PATENT DOCUMENTS 3,771,037 A * 11/1973 Bailey, Jr. ............... B64C 13/04
244/237
5,125,602 A * 6/1992 Vauvelle ................ B64C 13/04
244/223
(Continued)

FOREIGN PATENT DOCUMENTS

| DE | WO 2008017344 A1 * | 2/2008 | ............... G05G 1/04 |
| EP | 2 136 280 A2 | 12/2009 | |
| GB | 2502038 A * | 11/2013 | ........... B60G 17/019 |

*Primary Examiner* — Vicky Johnson
(74) *Attorney, Agent, or Firm* — Blakely Sokoloff Taylor & Zafman LLP

(57) ABSTRACT

The invention relates to a joystick (1) for controlling an aircraft, including a frame (2), a lever (3), a mechanical linking assembly (4) for connecting the lever to the frame enabling a rotation of the lever (3) relative to the frame (2) about a first rotation axis (X), in which the mechanical linking assembly (4) includes a first pivot joint (9), the first pivot joint (9) including a first portion, a second portion movably mounted relative to the first portion, and at least two flexible blades, each flexible blade having an end that is attached to the first portion and another end that is attached to the second portion, and being resiliently deformable in order to enable a rotation of the second portion relative to the first portion along the first rotation axis (X) and to generate a return torque which hinders the rotation of the second portion relative to the first portion.

14 Claims, 10 Drawing Sheets

Figure 1:
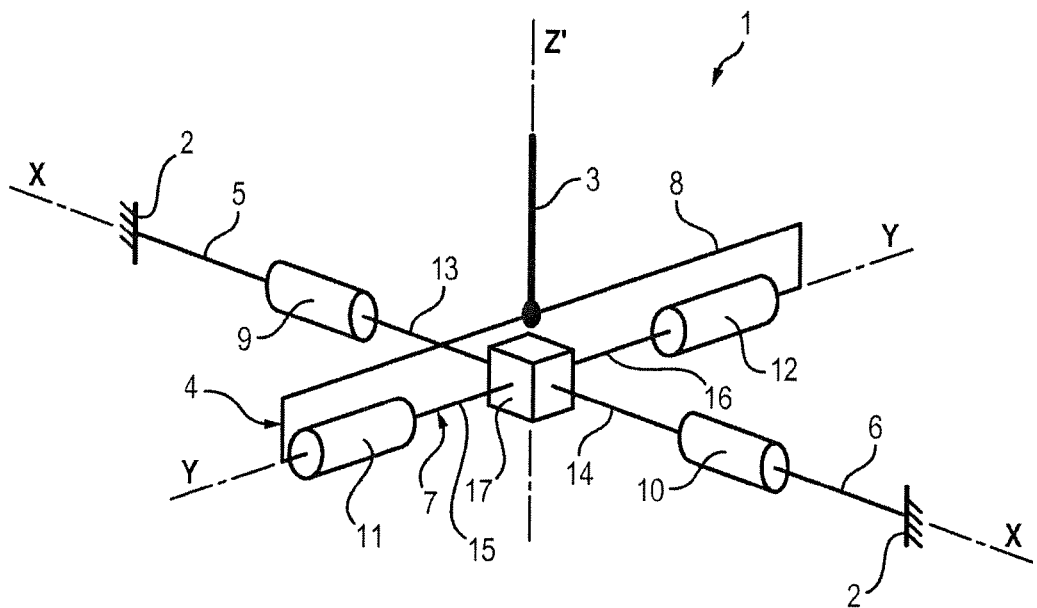

(51) Int. Cl.
    *G05G 5/03*           (2008.04)
    *G05G 1/04*           (2006.01)
    *G05G 9/047*         (2006.01)

(52) U.S. Cl.
    CPC ............... *G05G 2009/04766* (2013.01); *Y10T 74/20474* (2015.01)

(56) References Cited

U.S. PATENT DOCUMENTS

| | | | |
|---|---|---|---|
| 9,242,722 B2 * | 1/2016 | Buoy | B64C 13/04 |
| 2009/0314116 A1 * | 12/2009 | Bandera | B64C 13/04 |
| | | | 74/471 XY |

\* cited by examiner

JOYSTICK FOR CONTROLLING AN AIRCRAFT

FIELD OF THE INVENTION

The invention relates to a joystick for controlling an aircraft.

PRIOR ART

Conventional aircraft are known, the flight controls of which are controlled by shifting a control lever connected mechanically to the orientable flight controls of the wings.

Aircraft for which orientation of the flight controls is performed by electric and/or hydraulic actuators controlled by sensors for sensing movement of the lever are also known. On such devices, the lever is therefore not linked mechanically to the flight controls and the pilot does not sense any resistance from the lever, which lets him estimate movements of the flight controls and the forces they undergo.

But some control levers are equipped with active and/or passive devices for simulating a feedback force on the lever.

Also, in some planes equipped with electronic flight controls, the control stick has been replaced by a control device called a "joystick". More compact than a conventional control stick, the joystick is generally integrated into a pilot's seat armrest and comprises a lever which the pilot operates solely by the movement of his wrist. Installing joysticks has freed up the space between the pilot and the dashboard so that other equipment can be installed.

The joystick generally includes a set of springs for exerting a return force on each of the axes of rotation of the lever (roll axis and pitch axis) and to return the lever to a neutral position when the pilot exerts no force on the lever.

As the joystick is controlled by way of the wrist, return forces to be generated are much weaker than return forces generated on traditional control levers.

At the same time, the sensitivity of the pilot to the performance of the joystick is increased. It is therefore important to be able to generate return forces according to a law of force defined precisely and stably (that is, reproducible). However, the existence of friction in existing mechanisms tends to deteriorate behaviour of the joystick as is sensed by the pilot.

In particular, when the joystick is equipped with force sensors, friction occurs between the pieces of the mechanism causing bias and hysteresis in the measurements made by these sensors, such that the force feedback cannot be generated precisely.

Apart from friction problems, the usual passive devices are often a source of non-linearity of the elastic force, or even of coupling force, caused by displacement of an axis on the force sensed on the normally independent second axis. There are so many phenomena which contribute to imprecision of the force feedback.

SUMMARY OF THE INVENTION

An aim of the invention is to propose a joystick for controlling an aircraft, which is simple, robust and has no risk of jamming, to create return forces with good precision and stably.

This aim is attained, within the scope of the present invention, by a joystick for controlling an aircraft, comprising:
  a frame,
  a lever,
  a mechanical linking assembly of the lever au frame enabling rotation of the lever relative to the frame according to a first axis of rotation,
  wherein the mechanical linking assembly comprises a first pivot joint, the first pivot joint comprising a first part, a second part mounted mobile relative to the first part, and at least two flexible blades, each flexible blade having a end fixed to the first part and another end fixed to the second part and being resiliently deformable to enable rotation of the second part relative to the first part according to the first axis of rotation and generating a return torque tending to oppose rotation of the second part relative to the first part.

The structure of the pivot joint used in the mechanical linking assembly guides the lever in rotation without creating friction and at the same time generates a force feedback on the lever.

Also, the structure of the joint allows integrating sensors right inside the articulation.

Also, several pivot joints can be assembled in series to produce complex laws of force feedback.

The joystick according to the invention can also have the following characteristics:
  the second part of the first pivot joint is mobile in rotation relative to the first part of the first pivot joint from a rest position according to a first direction of rotation only, and the first pivot joint comprises a first stop arranged to prohibit travel of the second part in a second direction opposite the first direction,
  the mechanical linking assembly comprises a first set of pivot joints, including the first pivot joint and a second pivot joint, the second pivot joint comprising a first part and a second part mounted mobile in rotation relative to the first part from a rest position according to the second direction of rotation only, and the second pivot joint comprises a second stop arranged to prohibit travel of the second part in the first direction opposite the second direction,
  the first stop is arranged such that when the first joint is in the rest position, the blades of the first pivot joint are flexed and exert non-zero return torque on the second part of the first pivot joint,
  the first stop is adjustable in position so as to enable adjusting the non-zero return torque,
  at least one pivot joint comprises a first couple of blades and a second couple of blades, each couple of blades generating a return torque according to the first axis of rotation,
  the first couple of blades and the second couple of blades are arranged symmetrically relative to each other,
  at least one pivot joint comprises also an elastic element connecting the first part and the second part together and when the blades of the pivot joint are not flexed, the elastic element is in traction between the first part and the second part, such that the elastic element generates a return force tending to cause rotation of the second part relative to the first part,
  the mechanical linking assembly comprises a first chain of pivot joints, including the first pivot joint and a third pivot joint mounted in series with the first pivot joint, the first part of the first joint or respectively the second part of the first joint, being mounted integral with the second part or respectively of the first part of the third pivot joint,
  the first pivot joint comprises a first stop arranged to limit travel of the second part of the first pivot joint in a first direction of rotation, and the third pivot joint comprises a third stop arranged to limit travel of the first part of the third pivot joint in the first direction of rotation, such that when the lever is driven in rotation relative to the frame in the first direction of rotation, the first pivot joint and the third pivot joint are successively stopped, the first stop and/or the third stop is adjustable in position so as to enable adjusting the travel from which the first pivot joint and/or the third pivot joint is stopped, the mechanical linking assembly comprises a strain or deformation sensor mounted on one of the blades, the blade serving as a test body for the sensor, the mechanical linking assembly enables rotation of the lever relative to the frame according to a second axis of rotation, perpendicular to the first axis of rotation, and the mechanical linking assembly comprises a fourth pivot joint, the fourth pivot joint comprising a first part, a second part mounted mobile relative to the first part, and at least two flexible blades, each flexible blade connecting the first part and the second part together and being resiliently deformable to enable rotation of the second part relative to the first part according to the second axis of rotation and generate a return torque tending to oppose the rotation of the second part relative to the first part, the mechanical linking assembly comprises a second chain of pivot joints, including the fourth pivot joint and a fifth pivot joint mounted in series with the fourth pivot joint, the first part of the fourth joint or the second part of the fourth joint, being mounted integral with the second part or respectively with the first part of the fifth pivot joint.

PRESENTATION OF DRAWINGS

Figure 2A:
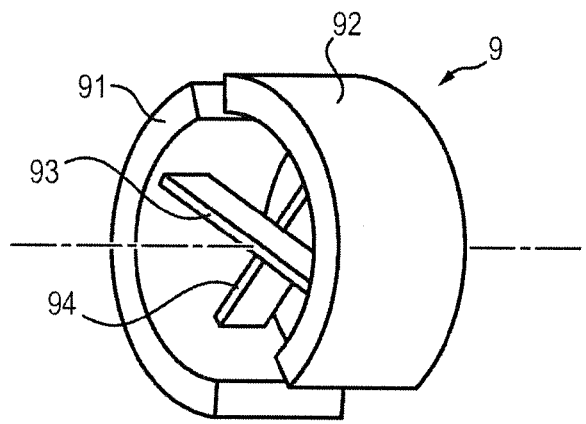
Figure 2B:
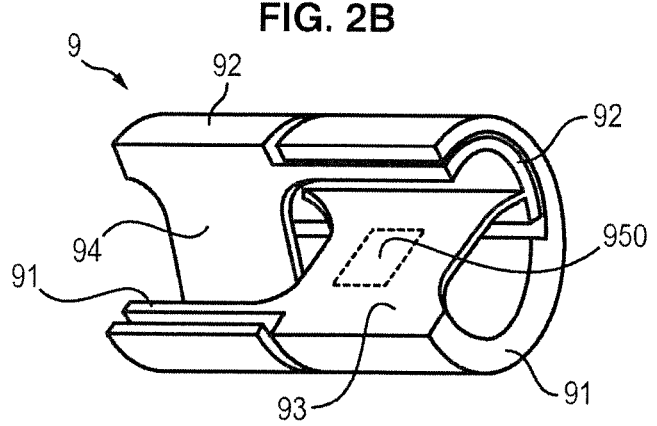
Figure 3A:
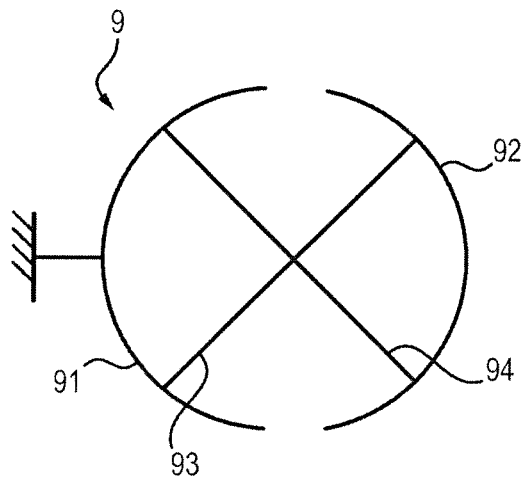
Figure 3B:
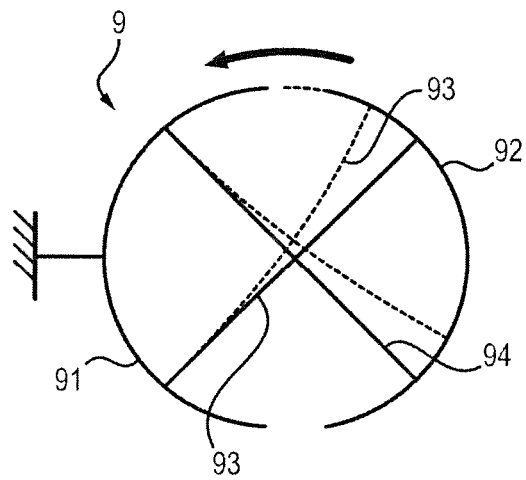
Figure 3C:
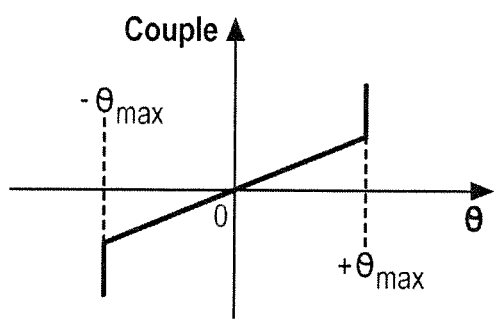
Figure 4:
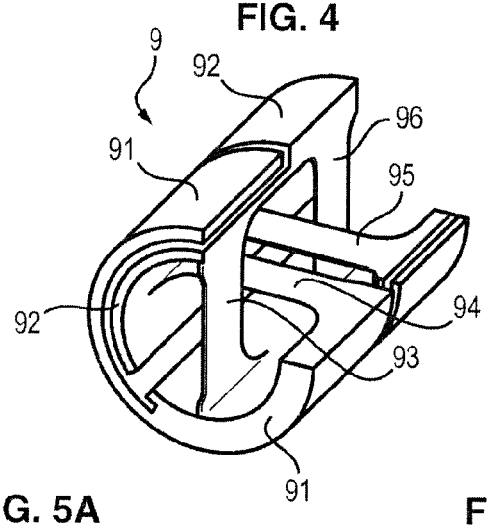
Figure 5A:
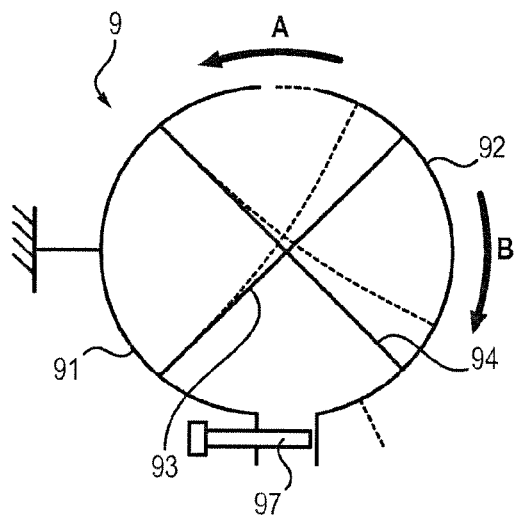
Figure 5B:
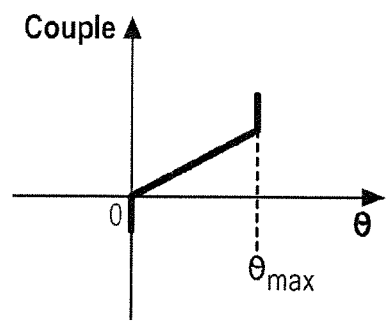
Figure 6A:
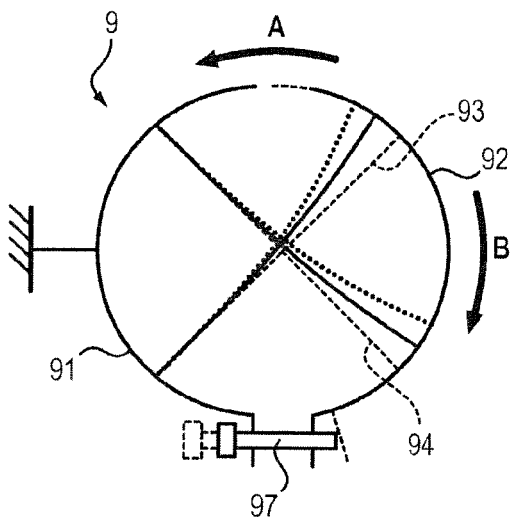
Figure 6B:
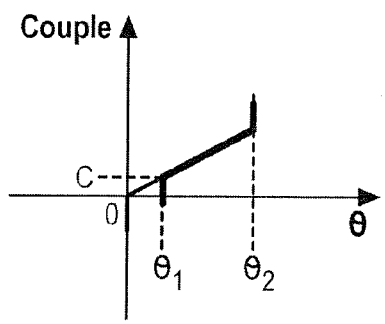
Figure 7A:
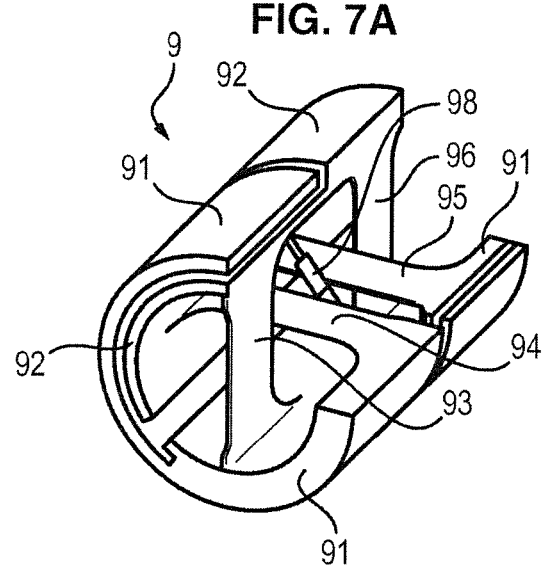
Figure 7B:
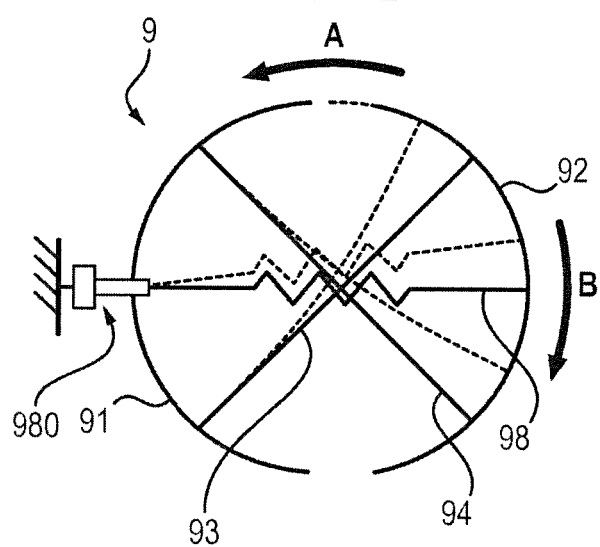
Figure 8A:
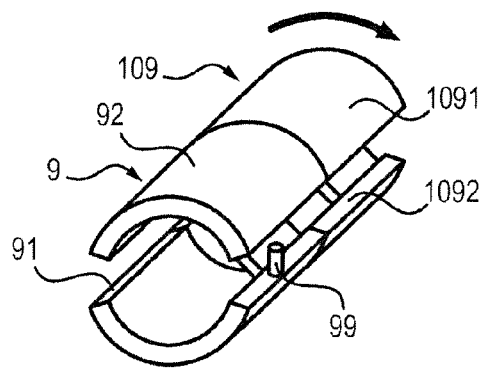
Figure 8B:
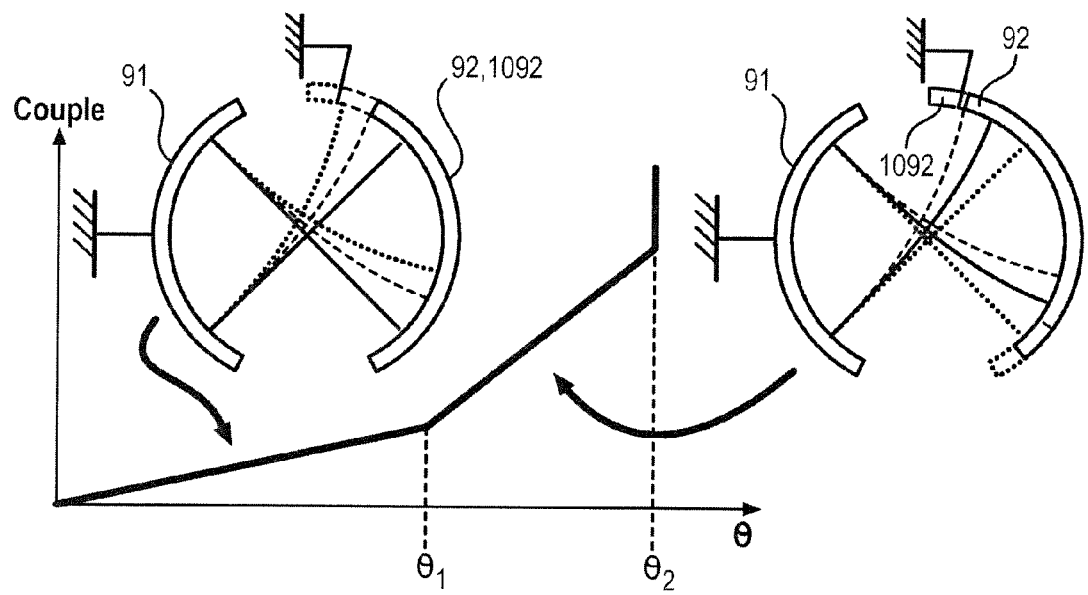
Figure 9A:
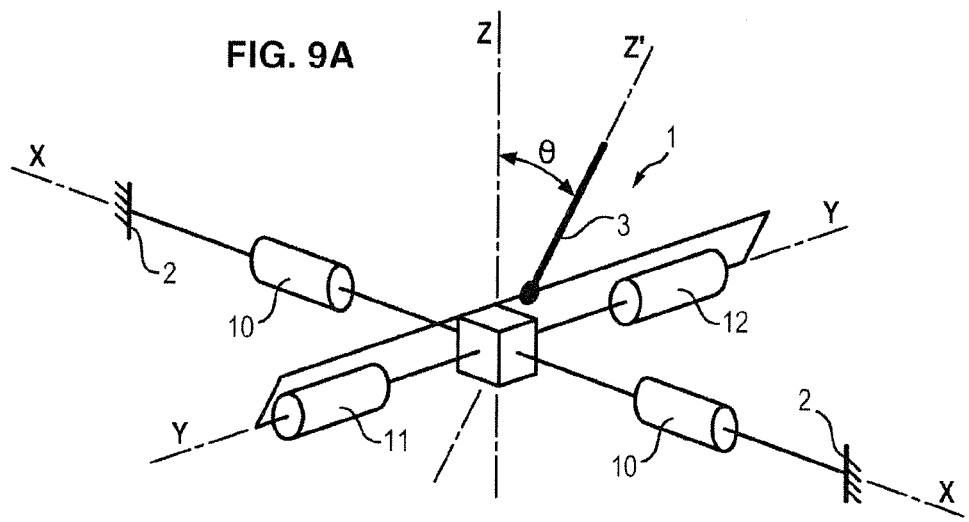
Figure 9B:
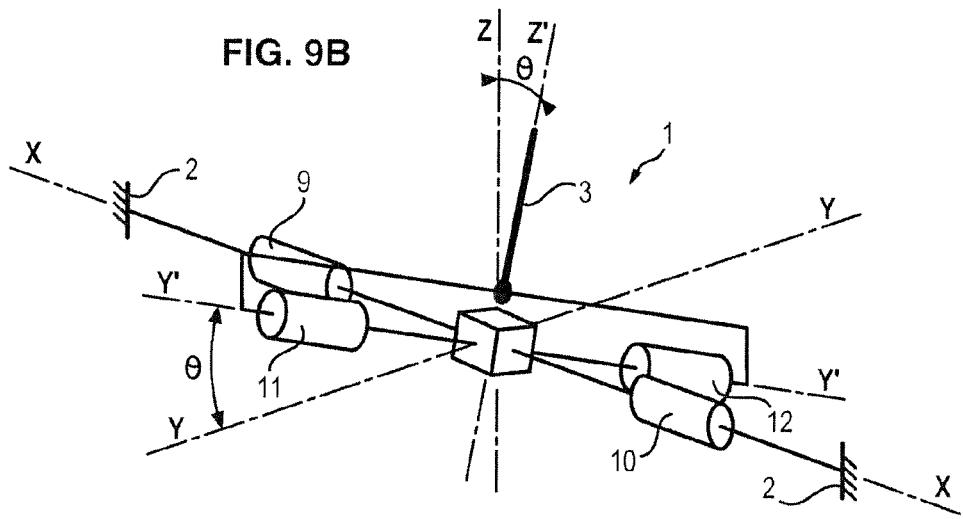
Figure 9C:
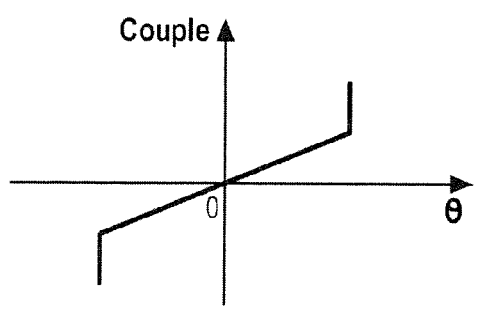
Figure 9D:
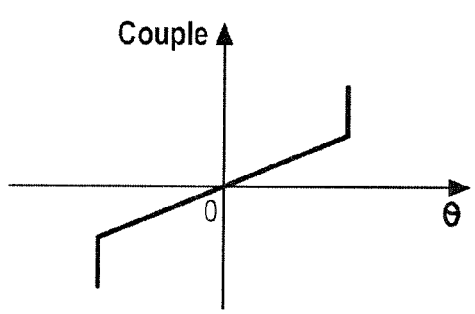
Figure 10:
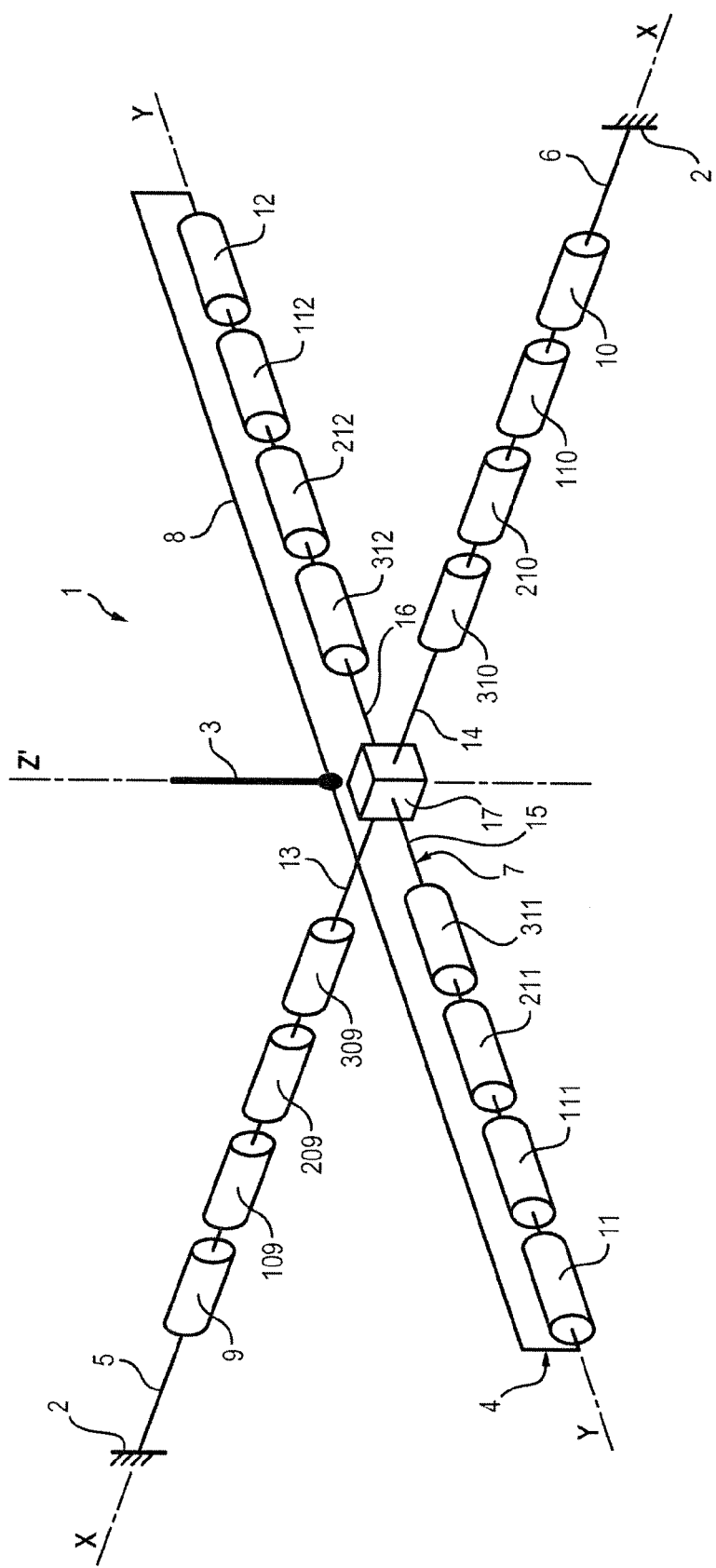
Figure 11A:
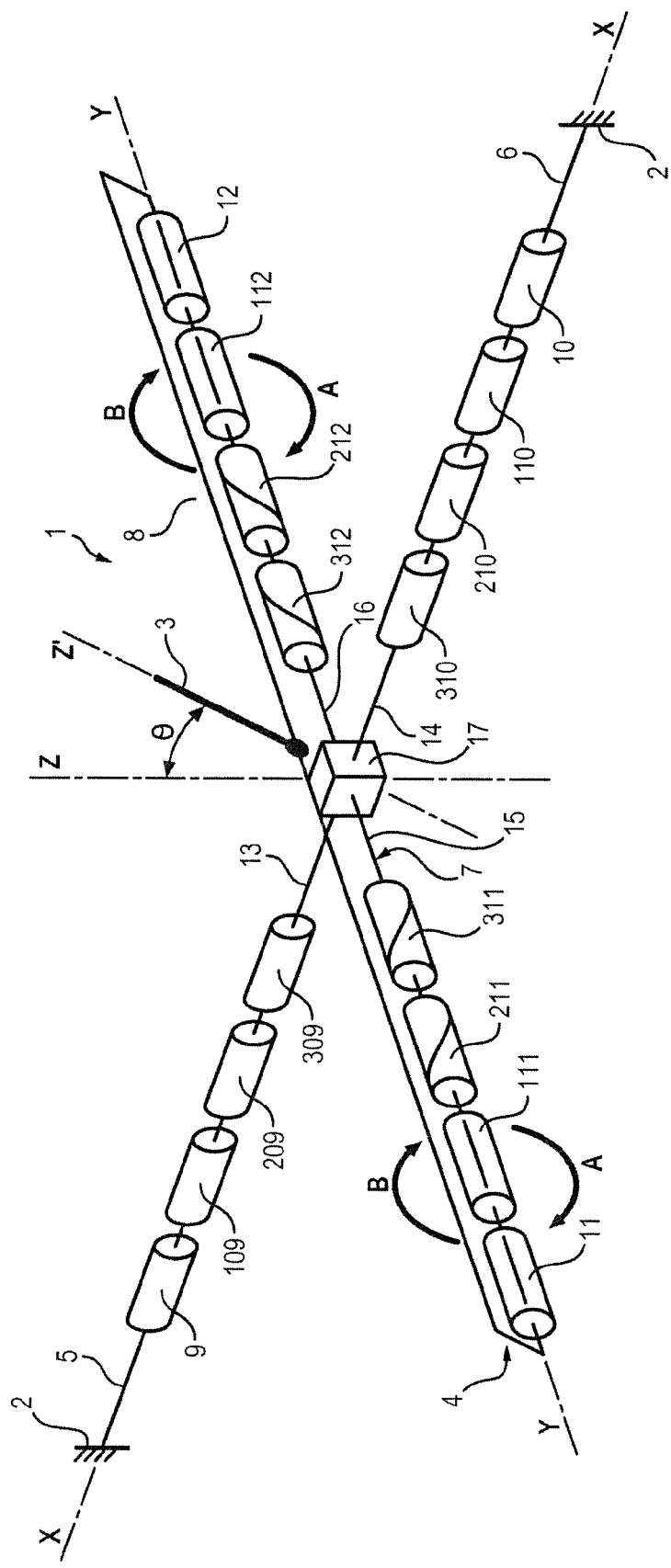
Figure 11B:
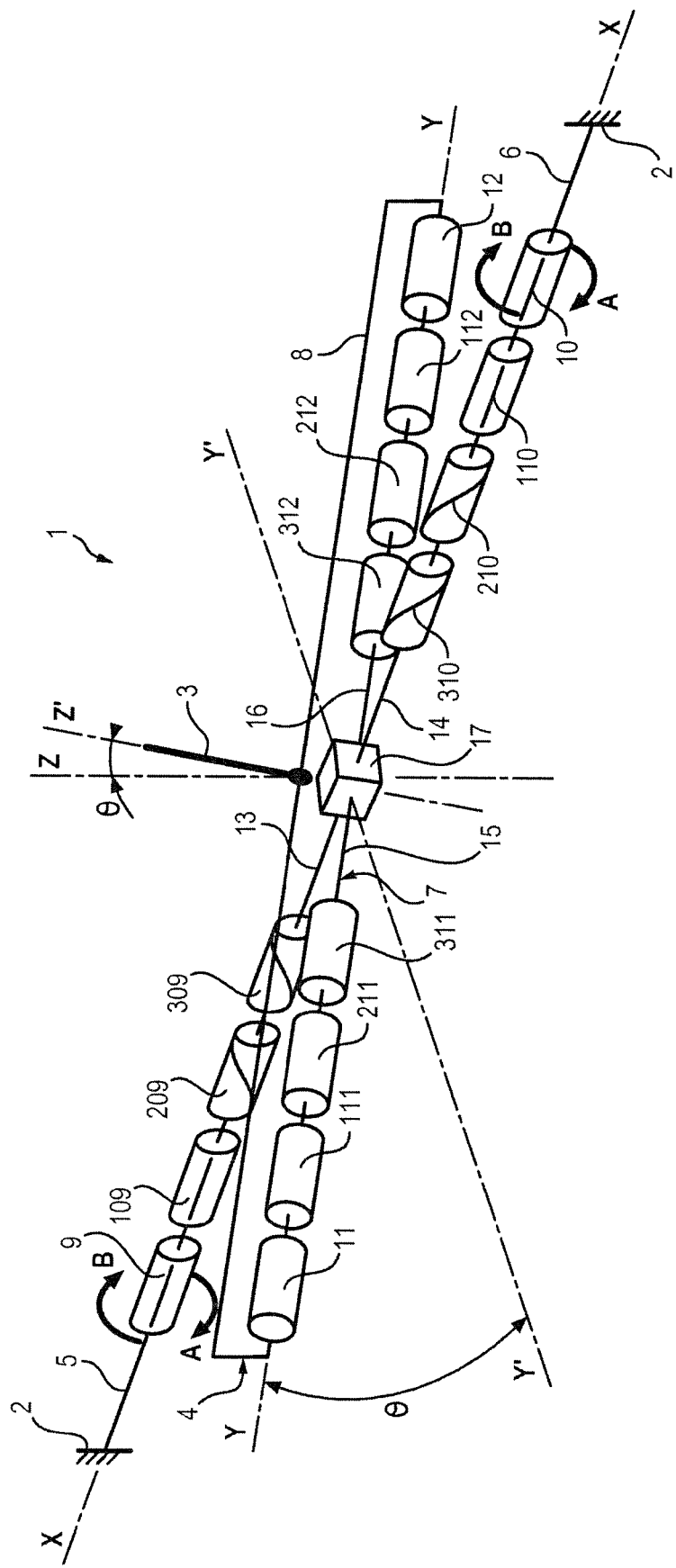
Figure 11C:
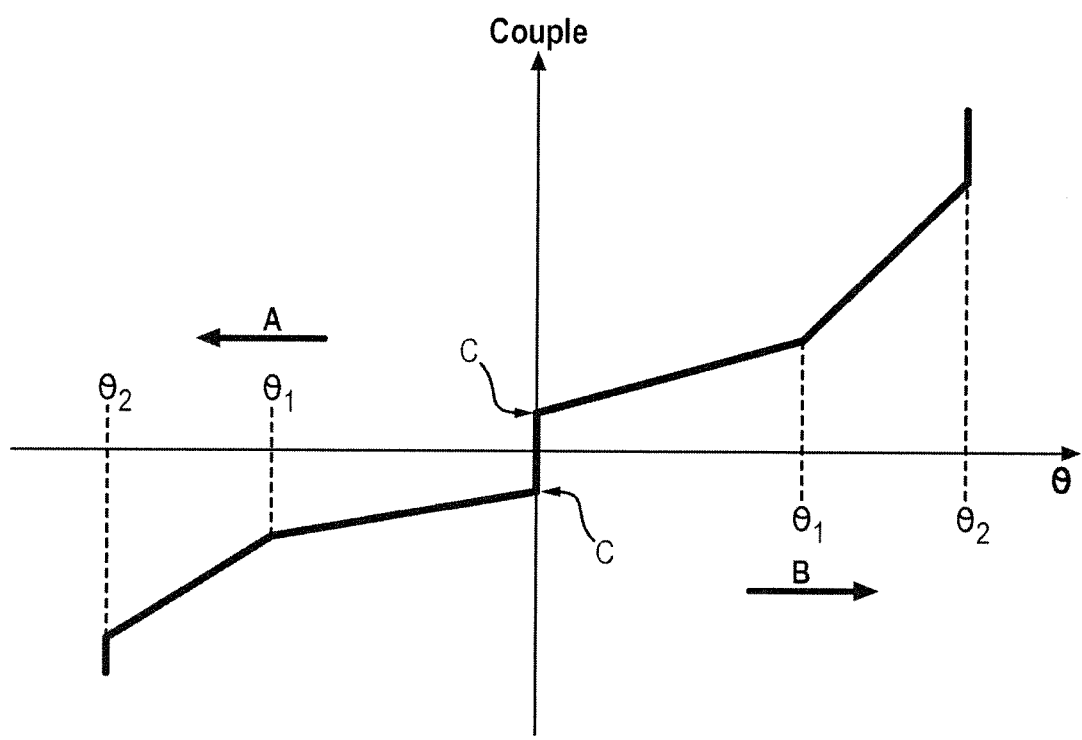

Other characteristics and advantages will emerge from the following description which is purely illustrative and non-limiting and must be considered with respect to the appended figures, in which:

FIG. 1 schematically illustrates a joystick according to a first embodiment of the invention, FIGS. 2A and 2B schematically illustrate a pivot joint which can be used in the joystick according to claim 1, FIGS. 3A to 3C schematically illustrate respectively the pivot joint in rest position, the pivot joint in loaded position and a law of variation of the couple generated by the pivot joint as a function of an angle of rotation about its principal axis, FIG. 4 schematically illustrates a first variant of the pivot joint, FIGS. 5A and 5B schematically illustrate respectively a second variant of the pivot joint and a law of variation of the couple generated by the joint as a function of an angle of rotation, FIGS. 6A and 6B schematically illustrate respectively a third variant of the pivot joint and a law of variation of the couple generated by the joint as a function of an angle of rotation, FIGS. 7A and 7B schematically illustrate a fourth variant of the pivot joint, FIGS. 8A and 8B schematically illustrate respectively an assembly in series of two pivot joints and a law of variation of the couple generated by the assembly as a function of an angle of rotation, FIG. 9A schematically illustrates the joystick according to the first embodiment in a configuration in which the lever is inclined according to a first axis of rotation, FIG. 9B schematically illustrates the joystick according to the first embodiment in a configuration in which the lever is inclined according to a second axis of rotation, perpendicular to the first axe, FIGS. 9C and 9D schematically illustrate a law of variation of the couple generated by the joint as a function of an angle of rotation respectively according to the first axis and according to the second axe, FIG. 10 schematically illustrates a joystick according to a second embodiment of the invention, FIG. 11A schematically illustrates the joystick according to the second embodiment in a configuration in which the lever is inclined according to a first axis of rotation, FIG. 11B schematically illustrates the joystick according to the second embodiment in a configuration in which the lever is inclined according to a second axis of rotation, perpendicular to the first axis, FIG. 11C schematically illustrates a law of variation of the couple generated by the joint as a function of an angle of rotation according to the first axis or according to the second axis.

DETAILED DESCRIPTION

FIG. 1 schematically illustrates a joystick 1 according to a first embodiment of the invention.

The joystick 1 comprises a frame 2 intended for example to be integrated into a pilot's seat armrest, a lever 3 mounted mobile in rotation relative to the frame 2, and a mechanical linking assembly 4 of the lever on the frame for generating a return of force on the lever according to two axes of rotation X and Y.

The lever 3 has a general elongated form according to a longitudinal direction (axis Z').

The mechanical linking assembly 4 comprises two support pieces 5 and 6 mounted fixed relative to the frame 2, an intermediate piece 7 mounted mobile in rotation relative to the support pieces 5 and 6 about the first axis X, and a connecting piece 8 on which is fixed the lever 3, the connecting piece 8 being mounted mobile in rotation relative to the intermediate piece 7 about the second axis Y. The second axis Y is perpendicular to the first axis X. Also, when the lever 3 is in neutral position, the axes X, Y and Z' are orthogonal to each other.

The mechanical linking assembly 4 also comprises a first couple of pivot joints 9, 10 and a second couple of pivot joints 11, 12.

The intermediate piece 7 has the form of a cross. More precisely, the intermediate piece 7 comprises four arms 13 to 16 extending from a common point of attachment 17, each arm being connected at the level of its free end to a respective pivot joint 9 to 12.

The first couple of pivot joints includes a first pivot joint 9 mounted between the support piece 5 and the intermediate piece 7 and a second pivot joint 10 mounted in parallel to the first pivot joint 9, between the support piece 6 and the intermediate piece 7. The pivot joints 9 and 10 enable rotation of the intermediate piece 7 relative to the frame 2 about the axis X.

The second couple of pivot joints includes a third pivot joint 11 mounted between the intermediate piece 7 and the connecting piece 8 and a fourth pivot joint 12 mounted in parallel to the third pivot joint 11, between the intermediate piece 7 and the connecting piece 8. The pivot joints 11 and 12 enable rotation of the intermediate piece 7 relative to the frame 2 about the axis Y.

The mechanical linking assembly 4 enables rotation of the lever 3 relative to the frame 2 simultaneously about the axis X and about the axis Y, for example letting the pilot control the aircraft for roll and pitch.

FIGS. 2A and 2B schematically illustrate a pivot joint 9 which can be used in a joystick according to FIG. 1.

The pivot joint 9 comprises a first part 91 and a second part 92 mounted mobile relative to the first part 91. The first part 91 is fixed to the support piece 5 (that is, the frame 2) and the second part 92 is fixed to the intermediate piece 7.

The first part 91 and the second part 92 each have a general cylindrical form and are positioned relative to each other with their axes of revolution combined, the two parts 91 and 92 having a cylindrical section of same internal radius relative to this common axis of revolution.

The pivot joint 9 also comprises two flexible blades 93 and 94, each flexible blade connecting the first part 91 and the second part 92 together. The two flexible blades include a first blade 94 extending parallel to a first plane and a second blade 93 extending parallel to a second plane, orthogonal to the first plane. The first plane and the second plane pass through the common axis of revolution of the parts 91 and 92.

Each flexible blade 93, respectively 94, has a first end fixed to the first part 91 and a second end fixed to the second part 92. More precisely, each end of the blade 93, respectively 94, is linked mechanically by a complete link (or housing) to one of the parts 91, 92.

The blades 93, 94 are resiliently deformable in flexion to enable rotation of the second part 92 relative to the first part 91 according to an axis of rotation corresponding to the common axis of revolution of the parts 91 and 92, and generate return torque tending to oppose rotation of the second part 92 relative to the first part 91.

So, the blades 93 and 94 ensure guiding in rotation of the second part 92 relative to the first part 91, according to a single degree of liberty (rotation according to a single axis of rotation).

The blades 93 and 94 work in pure flexion, and each blade can be used as a test body to support a sensor 950, such as a strain gauge for example. This produces measuring directly representative of the torque or travel nearest the origin and consequently, not perturbed by friction or play.

FIGS. 3A to 3C schematically illustrate the functioning of the pivot joint 9.

In FIG. 3A, the pivot joint 9 is in a rest position. In this position, the flexible blades 93, 94 are not flexed and generate no return torque.

In FIG. 3B, the second part 92 is driven in rotation relative to the first part 91. The flexible blades 93 and 94 (shown in dots) are flexed and, because of their elasticity, on the second part 92 generate return torque substantially proportional to the angle of rotation θ of the second part 92 relative to the first part 91.

FIG. 3C schematically illustrates the law of variation of the return torque generated by the pivot joint as a function of the angle of rotation θ. The return torque generated by the pivot joint 9 is proportional to the angle of rotation θ in both directions of rotation, in a range of angular travel between −θmax and +θmax. In this range, the law is linear and symmetrical relative to the rest position 0 of the pivot joint. The maximum angles of rotation −θmax and +θmax correspond to the end positions of the pivot joint in which the second part 92 is stopped against the first part 91.

The structure of the pivot joints 10 to 12 shown in FIG. 1 is identical to what has just been described for the pivot joint 9 in relation to FIGS. 2A, 2B, 3A, 3B and 3C.

FIG. 4 schematically illustrates a first variant of the pivot joint 9 of FIGS. 2A and 2B.

In this variant, the pivot joint 9 comprises four blades 93 to 96. The blades include a first couple of blades 93, 94 and a second couple of blades 95, 96, the couples of blades being arranged symmetrically relative to each other.

Each couple of blades comprises a first blade 93 (respectively 96) extending parallel to a first plane and a second blade 94 (respectively 95) extending parallel to a second plane orthogonal to the first plane.

The first blades 93 and 96 (or lateral blades) extend on either side of the second blades 94 and 95 (or central blades), the second blades 94 and 95 being arranged side by side.

This first variant provides security in case of cracking of one of the blades. In case of accidental cracking of one of the blades, it is possible to retain functioning in downgraded mode by retaining the guide function of the pivot link, without loss of travel, and with functional stiffness diminished by a quarter only (one blade in four in nominal rotation mode). The blades must be separated from each other beyond their housing so that any breakage of one blade does not spread to the other blade.

FIG. 5A schematically illustrates a second variant of the pivot joint 9.

In this variant, the second part 92 of the pivot joint 9 is mobile in rotation relative to the first part 91 of the pivot joint from a rest position (position of the joint when no force is applied to the joint), according to a first direction of rotation only (arrow A). For this purpose, the pivot joint 9 comprises a stop 97 arranged to prohibit rotation of the second part 92 relative to the first part 91 in a second direction of rotation (arrow B), opposite to the first direction.

FIG. 5B schematically illustrates the law of variation of the return torque generated by the pivot joint 9 as a function of an angle of rotation θ of the second part relative to the first part. The return torque generated by the pivot joint 9 is proportional to the angle of rotation θ in the first direction of rotation, in a range of travel between 0 and +θmax. In this range, the law is linear.

FIG. 6A schematically illustrates a third variant of the pivot joint.

In this variant, the stop 97 is arranged such that when the joint is in a rest position (that is, no force is being applied to the joint), the blades 93, 94 of the pivot joint 9 are flexed and exert on the second part 92 of the joint non-zero return torque tending to keep the second part 92 supported against the stop 97. FIG. 6B schematically illustrates the law of variation of the return torque generated by the pivot joint 9 as a function of the angle of rotation θ. The return torque generated by the pivot joint 9 is proportional to the angle of rotation θ in the first direction of rotation (arrow A), in a range of travel between +θ1 and +θ2, with +θ2>+θ1>0. In this range, the law is linear. The extreme angles of rotation +θ$_1$ and +θ$_2$ correspond respectively to the position in which the second part 92 is supported against the stop 97 and to the position in which the second part 92 is supported against the first part 91 (the first part 91 constituting a stop for the second part 92).

The position of the stop 97 can be adjusted (for example by means of a threaded element) so as to adjust the angle+θ$_1$ to then adjust the minimal actuation torque C.

FIG. 7A schematically illustrates a fourth variant of the pivot joint 9.

This fourth variant is here identical to the second variant, but could apply to any other variant. In the fourth variant, the pivot joint 9 also comprises an elastic element 98, such as a spring for example, connecting the first part 91 and the second part 92 together. The elastic element 98 is held elongated over the entire range of angular travel of the second part 92 relative to the first part 91.

The elastic element 98 is arranged between the central blades 94, 95 and extends in a direction forming an angle of 45 degrees relative to the blades 93, 94, 95 and 96.

As is illustrated in FIG. 7B, when the blades 93 to 96 of the pivot joint 9 are not flexed, the elastic element 98 passes through the axis of rotation of the second part 92 relative to the first part 91, such that even though the elastic element 98 is in traction between the first part 91 and the second part 92, it exerts no torque between the latter. In other words, the elastic element 98 is in a position of equilibrium when the blades 93 to 96 are not flexed, and it therefore exerts no force between the first part 91 and the second part 92.

Since the second part 92 is shifted in rotation relative to the first part 91, the resilient force generated by the elastic element 98 no longer passes through the axis of rotation of the pivot joint 9, and it tends to favour rotation in the same direction as that of the second part 92 relative to the first part 91.

Because of this arrangement, the elastic element 98 generates negative return torque which compensates, at least in part, the positive return torque generated by the blades 93 to 96. Selecting appropriately the characteristics of the elastic element 98 makes it possible to design a pivot joint 9 without friction and having zero stiffness near the neutral position.

Also, it is possible to provide adjusting means 980 of the tension of the elastic element 98 (for example a threaded element cooperating with the first part 91), for adjusting the resulting stiffness of the pivot joint 9.

FIG. 8A schematically illustrates an assembly in series of two pivot joints 9 and 109, for forming a chain of pivot joints. In this assembly, the first part 1091 of the pivot joint 109 is fixed to the second part 92 of the pivot joint 9.

Also, in the example shown in FIG. 8A, just one of the pivot joints 9 comprises a stop 99 limiting the travel of the pivot joint.

The position of the stop 99 can be adjusted (for example by means of a threaded element cooperating with the first part 91 of the pivot joint 9) so as to adjust the angle $+\theta_1$ for change of stiffness of the assembly.

FIG. 8B schematically illustrates the law of variation of the return torque generated by the assembly of pivot joints as a function of the angle of rotation $\theta$ of the second part 1092 of the pivot joint 109 relative to the first part 91 of the pivot joint 9.

The resulting law of variation has a double slope. More precisely, the stiffness follows a law of variation defined by sections.

In a first range of travel between 0 and $\theta_1$, the two pivot joints 9 and 109 are driven in rotation simultaneously. The resulting return torque generated by the assembly of joints 9 and 109 is a combination of individual return torques generated by the two pivot joints 9 and 109. This resulting return torque is proportional to the angle of rotation $\theta$ of the second part 1092 of the pivot joint 109 relative to the first part 91 of the pivot joint 9 with a first stiffness resulting from the combination of individual stiffness of the two pivot joints 9 and 109 in series.

When the angle of rotation $\theta$ reaches $\theta_1$, the second part 92 of the pivot joint 9 comes into contact against the stop 99 such that the second part 92 can no longer be driven in rotation relative to the first part 91.

In a second range of travel between $\theta_1$ and $\theta_2$, the return torque generated by the assembly of the joints 9 and 109 varies in a linear manner with a second stiffness equal to individual the stiffness of the pivot joint 109 alone.

When the angle of rotation $\theta$ reaches 02, the second part 1092 of the pivot joint 109 arrives stopped against the first part 1091 of the pivot joint 109 and the second part 1092 can no longer be driven in rotation relative to the first part 1091. No rotation of the assembly is possible beyond $\theta_2$.

The same functioning can be obtained by assembling in series pivot joints 9 and 109 having the same angular travel, but different degrees of stiffness. In fact, with equal travel, the supplest pivot joint arrives stopped before the stiffest pivot joint. When the supplest pivot joint reaches its stop, the stiffness of the assembly, initially less than each of the two degrees of stiffness, will be returned to the stiffness of the stiffest pivot joint which will not yet have reached its stop.

FIG. 9A schematically illustrates the joystick 1 according to the first embodiment in a configuration in which the lever 3 is inclined by an angle $\theta$ according to the second axis of rotation Y.

FIG. 9C schematically illustrates the law of variation of the couple generated by the two joints 11 and 12 on the lever 3 as a function of the angle of rotation $\theta$ of the lever 3 relative to the frame 2 about the axis Y.

FIG. 9B schematically illustrates the joystick 1 according to the first embodiment in a configuration in which the lever 3 is inclined by an angle $\theta$ according to the first axis of rotation X.

FIG. 9D schematically illustrates a law of variation of the couple generated by the two joints 9 and 10 on the lever 3 as a function of the angle of rotation $\theta$ of the lever 3 relative to the frame 2 about the axis X.

FIG. 10 schematically illustrates a joystick 1 in keeping with a second embodiment of the invention.

This second embodiment is identical to the first embodiment, except that the first pivot joint 9 and the second pivot joint 10 have been replaced by a first chain of pivot joints 9, 109, 209, 309 and a second chain of pivot joints 10, 110, 210, 310 mounted between the support pieces 2 and the intermediate piece 7.

Similarly, the third pivot joint 11 and the fourth pivot joint 12 have been replaced by a third chain of pivot joints 11, 111, 211, 311 and a fourth chain of pivot joints 12, 112, 212, 312 mounted between the intermediate piece 7 and the connecting piece 8.

In the example shown in FIG. 10, each chain of pivot joints comprises four pivot joints mounted in series, including:
  two pivot joints mobile in rotation from a pre-stressed position according to a first direction of rotation only (arrow A), specifically the pivot joints 9, 109, 10, 110, 11, 111, 12, 112,
  two pivot joints mobile in rotation from a pre-stressed position according to a second direction of rotation only (arrow B), the second direction of rotation being opposite the first direction of rotation, specifically the pivot joints 209, 309, 210, 310, 211, 311, 212, 312.

For this purpose, the pivot joints 9, 109, 10, 110, 11, 111, 12, 112 comprise a stop 97, such as that which is shown in FIG. 5A or 6A, hampering travel of the joint in the second direction of rotation.

Similarly, the pivot joints 209, 309, 210, 310, 211, 311, 212, 312 comprise a first stop 97, such as that which is shown in FIG. 5A or 6A, prohibiting travel of the joint in the first direction of rotation.

Also, each of the pivot joints 9, 10, 11 and 12 comprises a second stop 99 limiting travel of the joint in the first direction of rotation, such as what is shown in FIG. 8A.

Similarly, each of the pivot joints 209, 210, 211 and 212 comprises a second stop 99 limiting travel of the joint in the second direction of rotation, such as that is shown in FIG. 8A.

FIG. 11A schematically illustrates the joystick 1 according to the second embodiment in a configuration in which the lever 3 is inclined relative to the frame 2 about a second axis of rotation Y.

As is illustrated in this figure, when the lever 3 is inclined in a second direction (arrow B) about the axis Y, only the pivot joints 211, 311 and 212, 312 work. The pivot joints 11, 111 and 12, 112 are stopped.

Inversely, when the lever 3 is inclined in a first direction (arrow A), opposite the second direction, only the pivot joints 11, 111 and 12, 112 work. The pivot joints 211, 311 and 212, 312 are stopped.

FIG. 11B schematically illustrates the joystick 1 according to the second embodiment in a configuration in which the lever 3 is inclined relative to the frame 2 according to the first axis of rotation X.

As is illustrated in this figure, when the lever 3 is inclined in a second direction (arrow B), only the pivot joints 209, 309 and 210, 310 work. The pivot joints 9, 109 and 10, 110 are stopped.

Inversely, when the lever 3 is inclined in a first direction (arrow A), opposite the first direction, only the pivot joints 9, 109 and 10, 110 work. The pivot joints 209, 309 and 210, 310 are stopped.

As is illustrated in FIG. 11C, this second embodiment produces a law of variation of the return torque generated according to the two axes X and Y having an initiation threshold, that is, the pilot must exert on the lever 3 a couple greater than a threshold value C to drive the lever in rotation according to each of the directions of the axes X and Y (combination of stiffness of pivot joints 9+109, 209+309 and 10+110, 210+310 according to each of the directions of the axis X and combination of stiffness of pivot joints 11+111, 211+311 and 12+112, 212+312 according to each of the directions of the axis Y).

Also, the law of variation has a double slope. More precisely, the stiffness of the assembly has a law of variation by sections. In a first range of travel between 0 and $\theta_1$, the return torque generated by the chain of pivot joints has a linear variation as a function of the angle of rotation $\theta$ with a first stiffness. In a second range of travel between $\theta_1$ and $\theta_2$, the return torque generated by the chain of pivot joints has a linear variation with a second stiffness (stiffness of pivot joints 109, 309 and 110, 310 according to each of the directions of the axis X and stiffness of pivot joints 111, 311 and 112, 312 according to each of the directions of the axis Y).

In this way, combination of several pivot joints assembled in series produces laws of complex force return, the characteristics and the assembly of the pivot joints able to vary as a function of the preferred law of force feedback.

The invention claimed is:

1. A joystick for controlling an aircraft, comprising:
   a frame,
   a lever,
   a mechanical linking assembly of the lever to the frame enabling rotation of the lever relative to the frame according to a first axis of rotation,
   wherein the mechanical linking assembly comprises a first pivot joint, the first pivot joint comprising a first part, a second part mounted mobile relative to the first part, and at least two flexible blades, each flexible blade having an end fixed to the first part and another end fixed to the second part and being resiliently deformable to enable rotation of the second part relative to the first part according to the first axis of rotation and generate a return torque tending to oppose rotation of the second part relative to the first part.

2. The joystick according to claim 1, wherein the second part of the first pivot joint is mobile in rotation relative to the first part of the first pivot joint from a rest position according to a first direction of rotation only, and wherein the first pivot joint comprises a first stop arranged to prohibit travel of the second part in a second direction opposite the first direction.

3. The joystick according to claim 2, wherein the mechanical linking assembly comprises a first set of pivot joints including the first pivot joint and a second pivot joint the second pivot joint comprising a third part and a fourth part mounted mobile in rotation relative to the third part from a rest position according to the second direction of rotation only, and wherein the second pivot joint comprises a second stop arranged to prohibit travel of the fourth part in the first direction opposite the second direction.

4. The joystick according to claim 2, wherein the second part abuts against the first stop when the first pivot joint is in the rest position, and the blades of the first pivot joint are flexed and exert non-zero return torque on the second part of the first pivot joint.

5. The joystick according to claim 4, wherein the first stop is configured to be adjustable in position so as to enable adjusting the non-zero return torque.

6. The joystick according to claim 1, further comprising a first couple of blades, and a second couple of blades, said first couple and said second couple including said at least two flexible blades, wherein the first pivot joint comprises said first couple of blades and said second couple of blades, each couple of blades generating a return torque according to the first axis of rotation.

7. The joystick according to claim 6, wherein the first couple of blades and the second couple of blades are arranged symmetrically relative to each other.

8. The joystick according to claim 1 wherein the first pivot joint further comprises an elastic element connecting the first part and the second part, and the elastic element is in traction between the first part and the second part, the elastic element for generating a return force to cause rotation of the second part relative to the first part.

9. The joystick according to claim 1, wherein the mechanical linking assembly comprises a first chain of pivot joints, including the first pivot joint and a second pivot joint mounted in series with the first pivot joint,
   wherein the first part of the first pivot joint is mounted integral with the second part of the second pivot joint, or
   the second part of the first pivot joint is mounted integral with the first part of the second pivot joint.

10. The joystick according to claim 9, wherein the first pivot joint comprises a first stop configured to limit travel of the second part of the first pivot joint in a first direction of rotation, and the second pivot joint comprises a second stop configured to limit travel of the third part of the second pivot joint in the first direction of rotation.

11. The joystick according to claim 10, wherein the first stop and/or the second stop is adjustable in position so as to enable adjusting the travel from which the first pivot joint and/or the second pivot joint is stopped.

12. The joystick according to claim 1, wherein the mechanical linking assembly comprises a strain or deformation sensor mounted on one of the blades, the blade serving as test body for the sensor.

13. The joystick according to claim 1 wherein the mechanical linking assembly enables rotation of the lever relative to the frame according to a second axis of rotation, perpendicular to the first axis of rotation, and wherein the mechanical linking assembly comprises a second pivot joint, the second pivot joint comprising a third part, a fourth part mounted mobile relative to the second part, and at least two flexible blades, each flexible blade connecting the third part and the fourth part together and being resiliently deformable to enable rotation of the fourth part relative to the second part according to the second axis of rotation and generate return torque tending to oppose rotation of the fourth part relative to the second part.

14. The joystick according to claim 13, wherein the mechanical linking assembly comprises a second chain of pivot joints, including the second pivot joint and a third pivot joint mounted in series with the second pivot joint,
- wherein the first part of the second pivot joint is mounted integral with the second part of the third pivot joint, or
- the second part of the second pivot joint is mounted integral with the first part of the third pivot joint.

* * * * *